United States Patent
Montgomery

(10) Patent No.: US 6,284,298 B1
(45) Date of Patent: Sep. 4, 2001

(54) FOOD PREPARATION PROCESS

(76) Inventor: Harold S. Montgomery, 2466 N. 66th St., Milwaukee, WI (US) 53213

( * ) Notice: Subject to any disclaimer, the term of this patent is extended or adjusted under 35 U.S.C. 154(b) by 0 days.

(21) Appl. No.: 09/452,416

(22) Filed: Dec. 1, 1999

(51) Int. Cl.[7] ................................. B65B 55/00
(52) U.S. Cl. ................ 426/393; 426/295; 426/405; 426/524
(58) Field of Search .................. 426/393, 418, 426/524, 395, 415, 410, 118, 392, 397, 405, 295; 53/440

(56) References Cited

U.S. PATENT DOCUMENTS

| | | | |
|---|---|---|---|
| 1,836,801 | * 12/1931 | Johnson | 198/348 |
| 3,138,935 | * 6/1964 | Morrison | 62/64 |
| 3,166,425 | * 1/1965 | Morrison | 426/393 |
| 3,415,664 | 12/1968 | Montgomery | 99/192 |
| 3,545,983 | * 12/1970 | Woods | 426/395 |
| 3,607,313 | * 9/1971 | Roth | 426/302 |
| 3,615,646 | 10/1971 | Neely et al. | 99/1 |
| 3,658,562 | * 4/1972 | Wilson | 426/395 |
| 3,685,308 | * 8/1972 | Lundquist | 62/60 |
| 3,704,139 | 11/1972 | Wilson | 99/192 |
| 4,218,486 | 8/1980 | Bieler et al. | 426/412 |
| 4,334,584 | * 6/1982 | Lermuzeaux | 62/388 |
| 4,426,401 | * 1/1984 | Ottow et al. | 426/394 |
| 4,478,861 | * 10/1984 | Montgomery et al. | 426/295 |
| 5,059,036 | * 10/1991 | Richison et al. | 383/61 |
| 5,721,000 | 2/1998 | Center et al. | 426/289 |
| 5,832,697 | * 11/1998 | Rogers | 53/440 |

* cited by examiner

*Primary Examiner*—Nina Bhat
(74) *Attorney, Agent, or Firm*—Andrus, Sceales, Starke & Sawall, LLP

(57) ABSTRACT

An improved method for preparing a frozen food product is provided. The food product comprises a variety of food pieces that have been precooked in the presence of water and subjected to a process in which substantially all of the free water present with the food pieces is removed. The food pieces are then passed through a continuous freezing unit which increases the rigidity of the food pieces and leaves an amount of water on the surfaces of the food pieces. The food pieces are placed into a heat sealable container that includes a porous end piece along with measured amounts of a freezing gas and an adjuvant. The container is then sealed across the porous end piece and placed on a tumbling mechanism that coats the food pieces with the adjuvant and completes the freezing process as the freezing gas escapes through the porous end piece on the container. After completion of the tumbling process, the containers are resealed beneath the porous end piece so that the porous end piece may be trimmed from the container, allowing the container to be packaged and shipped for sale.

15 Claims, 3 Drawing Sheets

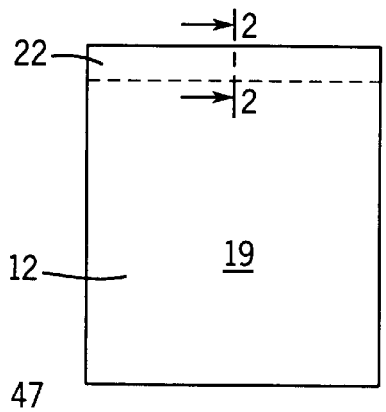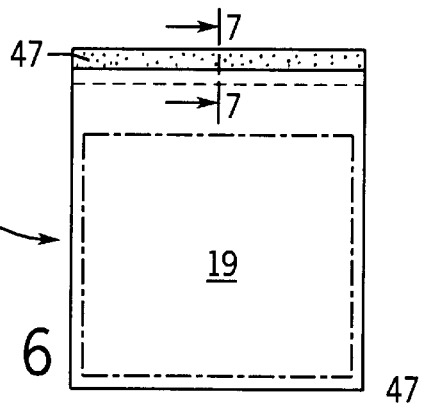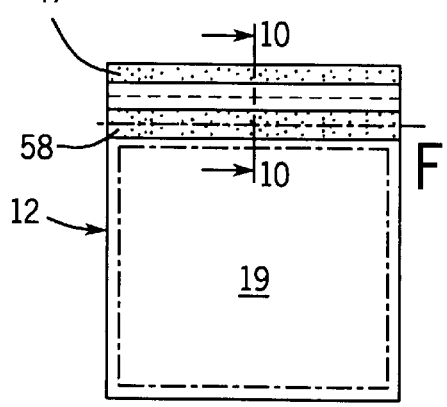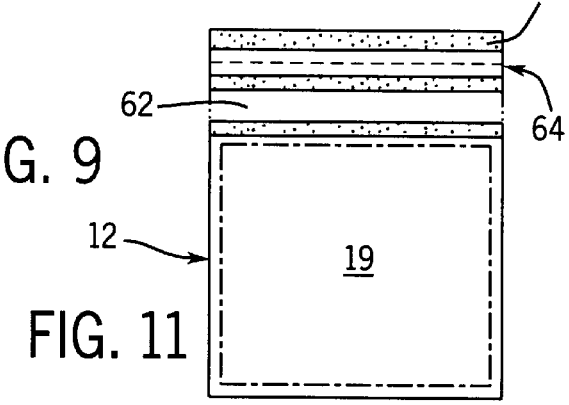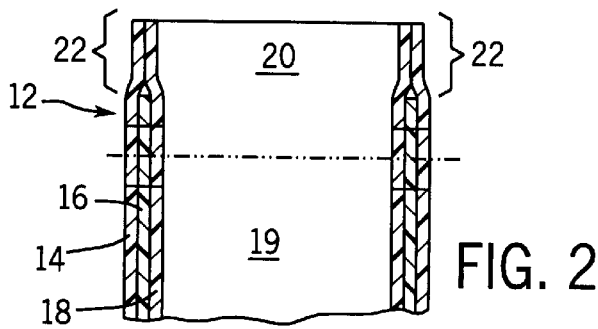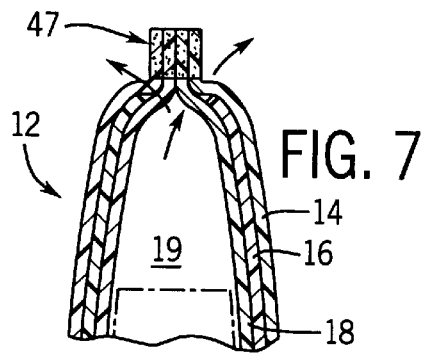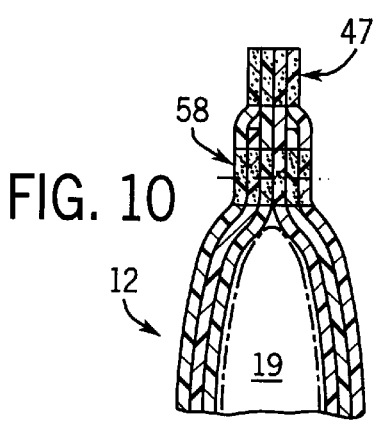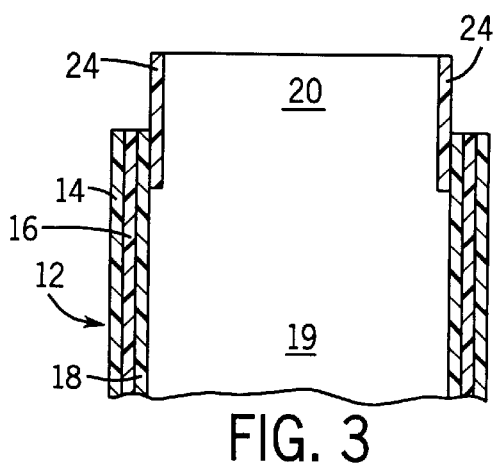

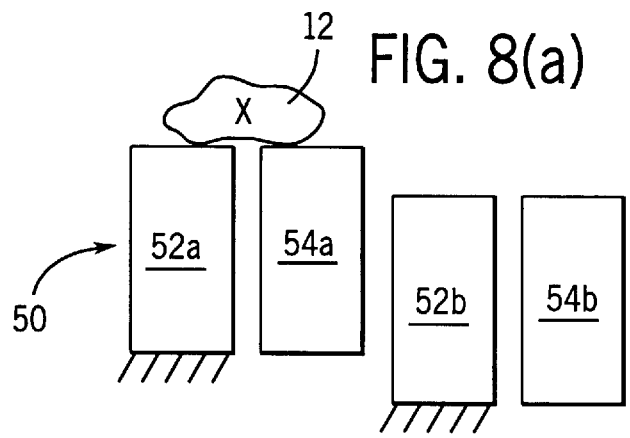
FIG. 8(a)
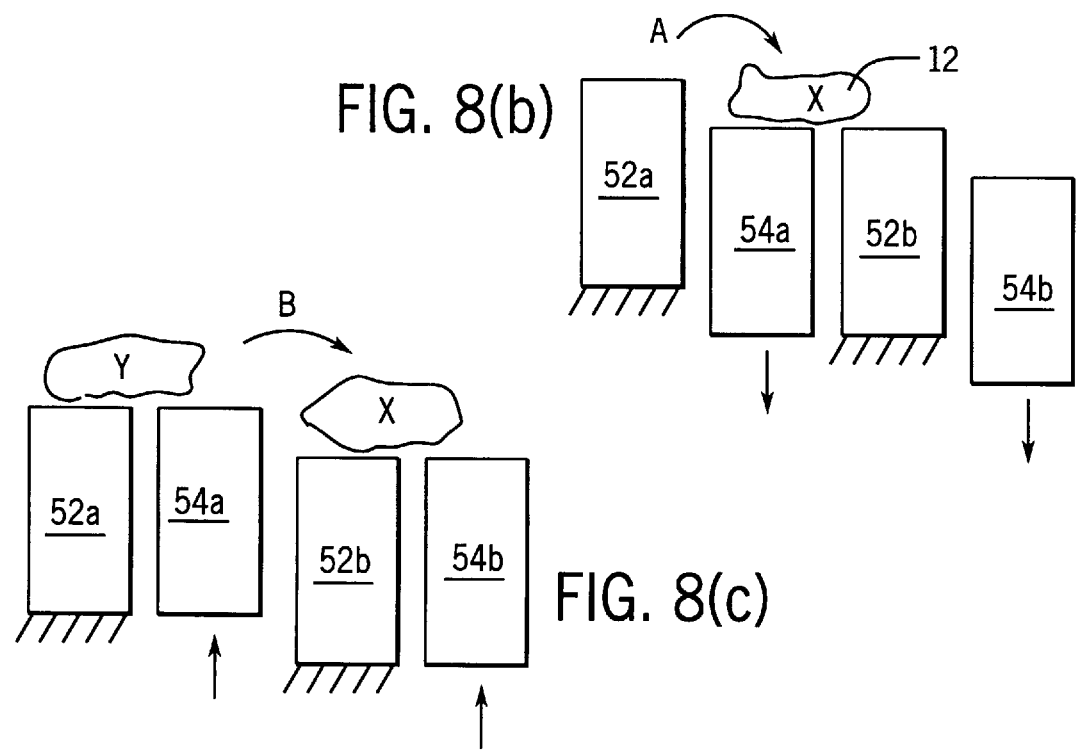
FIG. 8(b)
FIG. 8(c)
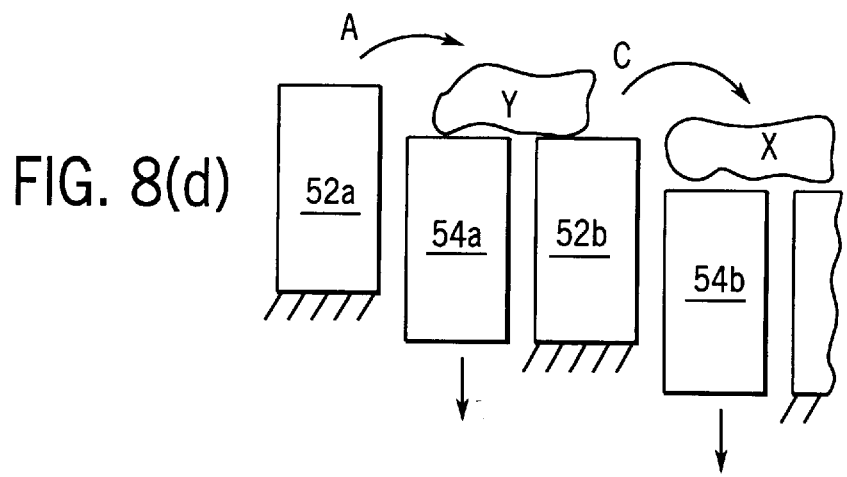
FIG. 8(d)

FOOD PREPARATION PROCESS

FIELD OF THE INVENTION

The present invention relates to the preparation of a frozen food product for later use, and is based on an improvement over the concepts disclosed in U.S. Pat. No. 4,478,861 issued Oct. 23, 1984, the contents of which are incorporated herein by reference.

BACKGROUND OF THE INVENTION

In U.S. Pat. No. 4,478,861, there is disclosed a method for preparing a frozen food product. The food product used in the method includes food pieces (such as meat, potatoes, carrots, peas, or the like) that are cooked in the presence of water. After cooking, substantially all of the free water present with the cooked food pieces is removed in a manner known in the art, leaving voids in the food mass formed by the cooked food pieces. The cooked food pieces are then charged to an agitator, which is normally a large rotating drum. While the food pieces are being agitated, a freezing gas, such as carbon dioxide ($CO_2$) gas, is introduced into the agitator to partially freeze the food pieces. The food pieces are only partially frozen by the gas, in order to leave an amount of unfrozen moisture on the exterior surfaces of the food pieces.

The reason for leaving the unfrozen moisture on the exterior surfaces of the food pieces is to allow a seasoning, or adjuvant, which is introduced into the agitator after or in conjunction with the freezing gas, to adhere to and coat each food piece. Adding the adjuvant to the partially frozen food pieces insures that the adjuvant will adhere to the residual moisture present on the food pieces. Once the adjuvant is added, additional freezing gas is introduced into the agitator to fully freeze the food pieces. The completely frozen food pieces are then placed within a container for deep freeze storage.

However, in the above-identified patent, the method is only capable of manufacturing and packaging a frozen food product in bulk form. In order to place the product into a more commercially viable form that can be sold directly to the ultimate consumer, the product must be repackaged from the original container into a number of smaller packages having a size more useful to the ultimate consumer.

Furthermore, when preparing a food product in bulk form, it is difficult to insure that the adjuvant added to the product is evenly distributed throughout the entire product. In many instances, the adjuvant tends to concentrate in certain areas of the agitator, resulting in over-seasoned product in those areas and under-seasoned product in others.

Lastly, when preparing a frozen food product according to this method, it is necessary to have a large agitator in which to place the entire batch of food product for preparation. Having an agitator of this size necessarily increases the cost of producing the product by requiring a large expense in acquiring the equipment and for the maintenance and repair of the agitator should it become damaged.

Therefore, it is desirable to develop a process by which a frozen food product may be prepared and packaged in containers having a size appropriate for sale directly to an ultimate consumer.

Furthermore, it is also desirable to develop a process for preparing a frozen food product in which the adjuvant can be more precisely proportioned with the food product to lessen the occurrence of under-seasoned and over-portions of the food product.

Finally, it is desirable to develop a process having the above mentioned advantages that does not require the presence of a large agitator in order to produce the frozen food product.

SUMMARY OF THE INVENTION

It is an object of the present invention to provide an improved method for preparing a frozen food product which enables the frozen food product to be prepared and packaged in a container of a size that can be sold directly to an ultimate consumer.

It is a further object of the present invention to provide an improved method for preparing a frozen food product that allows increased precision with regard to the amount of adjuvant added to a predetermined amount of the frozen food pieces.

It is a still further object of the invention to provide an improved method for preparing a frozen food product that eliminates the need for a large cylindrical agitator to freeze and mix the adjuvant throughout the food pieces.

The present invention is an improved method for the preparation of a frozen food product. In accordance with the various objects of the invention, a number of food particles are cooked in water to a fully prepared state. After cooking, substantially all the free water present with the cooked food pieces is removed in a conventional manner. The removal of the water also does not dry out the food pieces, but leaves the food pieces moist.

After the free water has been removed, the food pieces are passed through a continuous freezing unit that partially freezes the food pieces. This initial freezing step does not completely freeze the food pieces, but leaves an amount of unfrozen moisture on the exterior surfaces of the food pieces.

Once the initial freezing step is completed, the pieces are weighed and a preselected weight of the partially frozen food pieces is placed into each of a plurality of sealable storage containers. Each container includes porous end sections that form the mouth of the container. In this manner, the food pieces are generally equally distributed amongst the containers. An amount of a freezing gas is also introduced into each container after the food pieces to complete the freezing of the food pieces within the container. The freezing gas used is normally in solid form, so that when the gas sublimates from the solid to the gaseous form, the gas also inflates the container as it freezes the food pieces.

After the freezing gas is placed within the container, but before the food pieces are completely frozen, a premeasured amount of an adjuvant is also added to the container. The amount of adjuvant added corresponds to the weight of the food pieces already within the container. The porous end section of the container is then sealed such that the food pieces, freezing gas, and adjuvant are retained within the container.

After being placed within the container, the solid freezing gas sublimates to its gaseous state and inflates the container enclosing the food pieces, adjuvant and freezing gas. The inflated containers are then tumbled using a suitable mechanism, intermixing the food pieces, adjuvant and freezing gas. This tumbling step allows the adjuvant to contact the food pieces and adhere to the surface moisture to evenly coat the food pieces. The tumbling step also serves to complete the freezing of the food pieces as they are coated with the adjuvant by mixing all of the food pieces into contact with the freezing gas.

While the freezing gas continues to freeze the coated food pieces, the gas leaks out of each container through the porous end section of the container. This allows the container to deflate as it is tumbled, consequently reducing the size of the container enclosing the coated frozen food pieces.

Because most of the freezing gas has leaked through the porous end section by the completion of the tumbling step, the container can be resealed below the porous end section to effectively prevent any gas or moisture from entering the container. The porous end section is then trimmed from the container, and the container can be placed in a storage freezer for later shipment and sale.

BRIEF DESCRIPTION OF THE SEVERAL VIEWS OF THE DRAWING

In the drawings:

FIG. 1 is a side elevation view of a plastic container utilized in the method of the present invention;

FIG. 2 is a cross-sectional view along line 2—2 of FIG. 1 illustrating the construction of the plastic container;

FIG. 3 is a cross-sectional view similar to FIG. 2 illustrating an alternative construction of the plastic container of FIG. 1;

FIG. 6 is a side elevation view of the plastic container of FIG. 1 including a first seal;

FIG. 7 is a cross-sectional view along line 7—7 of FIG. 6;

FIGS. 8(a)–8(d) are sequential side elevation views illustrating the process in which the sealed plastic containers of FIG. 7 are tumbled according to the method of the present invention;

FIG. 9 is a side elevation view of the plastic container of FIG. 6 including a second seal disposed beneath the first seal;

FIG. 10 is a cross-sectional view along line 10—10 of FIG. 9; and

FIG. 11 is a side elevation view of the plastic container of FIG. 9 with the first seal on the container removed from the container by a cut through the second seal.

DETAILED DESCRIPTION OF THE INVENTION

Figure 4:
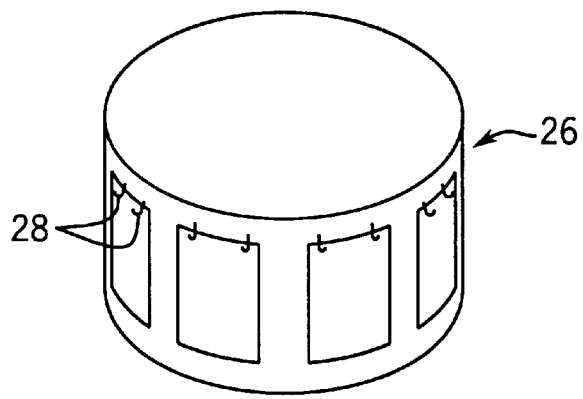
FIG. 4 is an isometric view of a carousel which supports a number of plastic containers during various steps of the method of the present invention.

Wherein like reference numerals designate like parts throughout the disclosure, a container 12 utilized in the present invention is disclosed in FIG. 1. The container 12 is generally a plastic bag formed of a thermoplastic material. Preferably, the container 12 is a laminated bag comprising an outer layer 14, an intermediate layer 16, and an inner layer 18. The outer layer 14 is formed of a printable thermoplastic material to which various labels can easily be affixed. The intermediate layer 16 is a gas-impermeable layer that prevents air and moisture from penetrating into the container to minimize the effects of freezer storage. The inner layer 18 is a thermoplastic layer capable of fusing to the intermediate and outer layers to form the container 12 that also functions as a liner for the interior of the container 12.

The container 12 has a generally rectangular shape shown in FIG. 1, but can be formed to have almost any shape desired. The container 12 is formed by sealing a pair of generally rectangular sheets of the laminated thermoplastic layers by sealing to one another along both sides and at one end to form a container 12 having an interior space 19 and an open end or mouth 20 as shown in FIG. 2. At the end of the container 12 forming the mouth 20, the intermediate layer 16 does not extend completely to the end of the container 12 forming the open end 20. At the open end 20, the outer layer 14 and the inner layer 18 are joined directly to one another and form a pair of porous end pieces 22 at the open end 20. Therefore, when the container 12 is sealed at the open end 20 by joining the porous end pieces 22, a gas contained within the container 12 may pass through the joined porous end pieces 22 to the outside atmosphere.

An alternative construction of the container 12 is shown in FIG. 3. In this construction, the container 12 is formed with the outer layer 14, intermediate layer 16, and inner layer 18 similarly to the previous construction. However, in this construction, the intermediate layer 16 is coextensive with the outer layer 14 and inner layer 18, and a pair of sections of a separate, porous material 24 are laminated to the inner layer 18 at the open end 20 along both sides of the container 12. The porous material pieces 24 extend outwardly from the open end 20 and can be sealed directly to one another to form the porous end piece 22 for the container 12.

The method in which the container 12 is used to prepare a frozen food product is illustrated in FIGS. 4–11. In the method, a generally circular carousel 26, shown in FIG. 4, is used to move each of the containers 12 through various steps of the method. The carousel 26 includes a plurality of pairs of hooks 28 disposed about its circumference that are used to retain individual containers 12 on the carousel 26. In operation, the carousel 26 rotates in a counterclockwise direction to move the containers 12 on the hooks 28 to a number of different stations where different steps of the method are performed.

Figure 5:
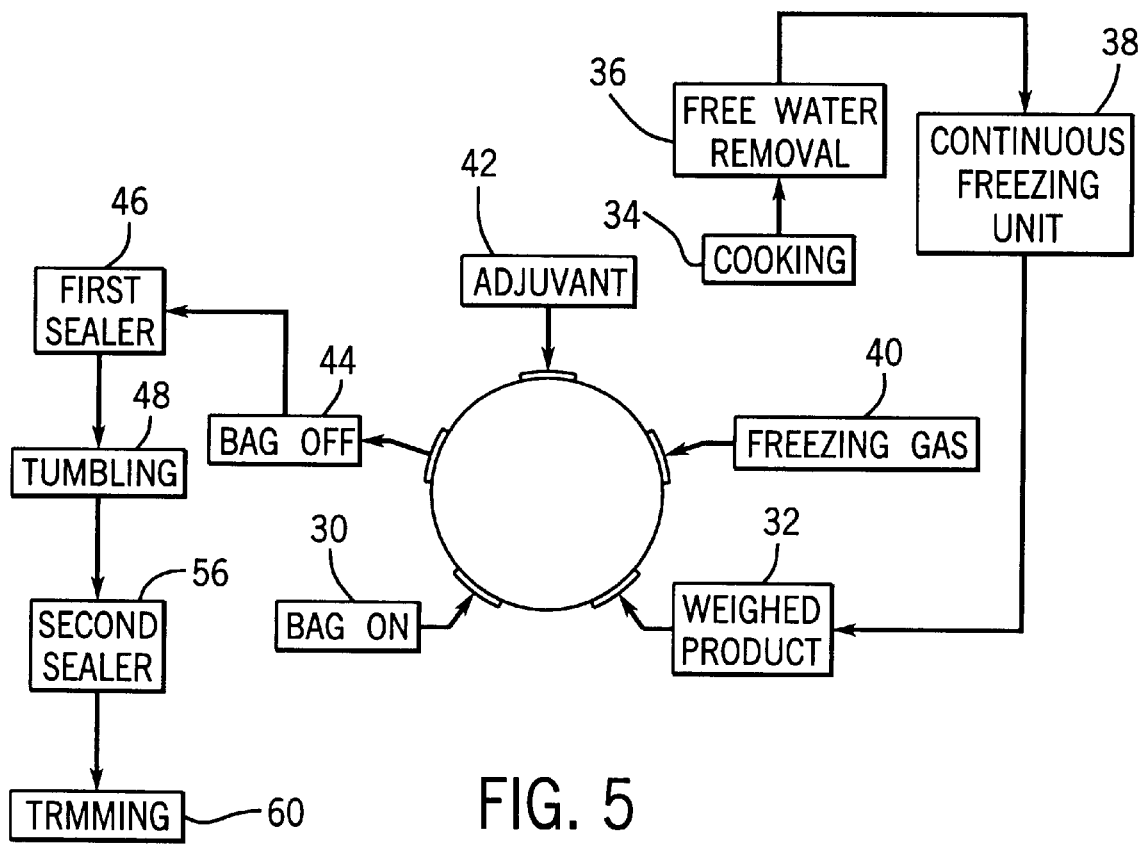
FIG. 5 is a schematic representation of the steps of the method of the present invention.

FIG. 5 schematically illustrates the various steps performed during the entire method for preparing the food product as the containers 12 rotate on the carousel 26. First, a number of the containers 12 are placed onto each pair of hooks 28 on the carousel 26 at a bag placement station 30. At this station 30, the open mouth 20 of the outermost container 12 on each pair of hooks 28 is folded back over the container to widen the open mouth 20 to better accept material into the container as the carousel rotates through the various stations.

The carousel 26 then rotates to position the container 12 at a weighed product filling station 32. At this station 32, an amount of a food product (not shown) is placed within the container 12. The food product can be placed within the container at filling station 32 in a variety of ways, such as by manually scooping the product into the container 12 or by using a volumetric filling machine (not shown).

The food product that is weighed and placed into the container 12 at station 32 comprises an amount of precooked food pieces (such as peas, carrots, meat, potatoes, and the like) prepared in a process similar to that disclosed in Montgomery et al U.S. Pat. No. 4,478,861, incorporated herein by reference. Initially, the food pieces are cooked to a fully prepared state in the presence of water at a cooking station 34. Subsequently, the remaining free water is removed at station 36, via a process known in the art, leaving the food pieces moist but with voids in the food pieces. Alternatively, the free water removal station 36 can be omitted by cooking the food pieces at cooking station 34 until all of the water present is either absorbed by the food pieces or has evaporated. The food pieces are then moved through a continuous freezing unit 38 that partially freezes the food pieces to rigidify them, while leaving a small amount of unfrozen moisture on the different surfaces of each food piece. From there, the partially frozen food pieces are transferred to the weighed product filling station 32 for placement within the containers 12.

As the carousel 26 rotates away from the filling station 32, the container 12 arrives at a freezing gas station 40. At this station, an amount of a freezing gas (not shown) is placed within the container 12 along with the partially frozen food pieces. The freezing gas preferably takes the form of solid carbon dioxide ($CO_2$), but may also be any suitable inert gas that sublimates directly from a solid state to a gaseous state. Most preferably, the solid $CO_2$ is placed within the container 12 as $CO_2$ snow manually discharged from a $CO_2$ horn (not shown). The horn converts liquid $CO_2$ from a tank (not shown) connected to the horn into the $CO_2$ snow placed into the container 12.

Once a sufficient amount of freezing gas has been added at station 40, the carousel 26 rotates further to move the container 12 containing the food product and freezing gas to an adjuvant station 42. At this station 42, a measured amount of a dry powdered adjuvant (not shown) is placed within the container 12 holding the freezing gas and weighed food product. The adjuvant can be placed into the container 12 in a manner similar to that in which the food product was placed in the container 12 at the weighed product station 32. Therefore, the adjuvant may be placed into the container 12 either manually or by some type of volumetric filling machine (not shown). The amount of adjuvant added to the container 12 corresponds to the amount of food product within the container 12. Because the amount of food product in the container is known to a high degree of certainty, an appropriate amount of adjuvant can be placed in the container with the food product to more closely and accurately control the seasoning of the food product and consequently prevent either under- or over-seasoning of the food pieces from occurring.

Once the adjuvant has been added to the container 12, the carousel 26 rotates to position the container 12 at a bag removal station 44. At this station, the outermost containers 12 holding the food product, freezing gas, and adjuvant are removed from the hooks 28 on the carousel 26, exposing another container 12 to be filled in the same manner. The bags are then placed into a heat sealer (not shown) at a first sealing station 46 to close each container 12 by heat sealing the open end 20 to form a first seal 47 on each container 12 as shown in FIGS. 6–7. The first seal 47 effectively encloses the food product and adjuvant within the interior space 19 of the container 12 by sealing the porous end pieces 22 on the container 12 to one another. The heat sealer located at the first sealing station 46 may be a manual sealer whereby each container 12 is individually positioned within the sealer and sealed, or may be a mechanical sealer in which the containers 12 are placed on a conveyor belt (not shown) such that the open ends 20 of the containers 12 continuously pass through the sealer disposed on one side of the conveyor belt.

When the containers 12 are sealed, the subliming freezing gas present within each container 12 inflates the container as the freezing gas changes from a solid to a gaseous form. As the container 12 is inflated by the freezing gas, the food products and adjuvant within the interior space 19 of the container 12 are free to move about the expanded interior of the container 12.

After the open end 20 of each container 12 has been sealed, the container 12 is transported to a tumbling station 48. At the tumbling station 48, the container 12 is tumbled, or agitated, such that the food product, adjuvant and freezing gas contained within the now inflated container 12 move about the interior of the container. The tumbling process allows the adjuvant to adhere to the residual moisture present on the surfaces of the food product. Furthermore, in conjunction with coating the food product with the adjuvant, the tumbling of the containers 12 allows the freezing gas to more effectively contact each of the food product pieces within the container 12 and complete the freezing process.

FIGS. 8(a)–8(d) more clearly illustrate the operation of an oscillating staircase mechanism 50 comprising staggered pairs of stationary steps 52 and oscillating steps 54 that is preferably used at the tumbling station 46. In FIG. 8(a), a container 12 is initially placed on an aligned first pair of steps 52a, 54a of the oscillating staircase 50. The first step 52a remains stationary throughout the process, while the second step 54a is capable of oscillatory motion in a vertical direction. As shown in FIG. 8(b), when the second step 54a moves downwardly from its position in alignment with the first step 52a, the container 12 rolls off of the first step 52a in a counterclockwise direction illustrated by arrow A. The container 12 then comes to rest upon the second step 54a and third step 52b of the staircase that are now in alignment with one another. In FIG. 8(c), the second step 54a returns to its original position aligned with the first step 52a. In doing so, the second step 54a rolls the container 12 in a counterclockwise direction indicated by arrow B onto the second pair of steps 52b, 54b of the staircase mechanism 50. At the same time, a second container 12 is deposited on the realigned first pair of steps 52a, 54a. While the second step 54a oscillates to tumble the second container 12, the fourth step 54b oscillates in conjunction with the second step 54a, and consequently initials a second tumbling operation on the first container 12 shown by arrow C. The staircase mechanism 50 can consist of as many pairs of oscillating and stationary steps as needed to complete the coating and freezing of the food product contained within each container 12.

While the containers 12 are tumbled on the staircase mechanism 50, the freezing gas leaks out of the container 12 through the porous end piece 22 as it freezes the food product, allowing the interior space 19 of the container 12 to slowly deflate throughout the tumbling process. Therefore, at the completion of the tumbling process, the amount of freezing gas present within the container 12 is minimal because most of the gas has leaked from the container 12 through the porous end piece 22.

Once the tumbling process is completed, the containers 12 are removed from the bottom of the staircase mechanism 50 and transported to a second sealing station 56. As shown in FIG. 9–10, a heat sealer (not shown) at the second sealing station 56 forms a second seal 58 on the container 12 between the food product and the first seal 47. The second seal 58 is spaced inwardly on the container 12 from the first seal 47 a sufficient distance such that the second seal 58 is formed below the porous end piece 22 and above the interior space 19 on a portion of the container 12 including the intermediate gas impermeable layer 16. The second seal 58 thus effectively seals the interior space 19 of the container 12 from the atmosphere to prevent air and moisture from prematurely entering the container 12.

After the second seal 58 is formed by at the second sealing station 56, each container 12 is passed to a trimming station 60. At trimming station 60, a cutting device (not shown) makes a cut 62 through the second seal 58. The cut 62 separates a container portion 64, including the porous end piece 22 and first seal 47, from the remainder of the container 12 which remains sealed by the portion of second seal 58 remaining on the container 12, as shown in FIG. 11. The container portion 64 is discarded and the sealed container 12 may be packaged and shipped for sale to the ultimate consumers.

Various alternatives and embodiments are contemplated as being in he scope of the following claims particularly pointing out and distinctly claiming the subject matter regarded as the invention.

I claim:

1. An improved method for preparing a frozen food product wherein the food product is prepared by cooking a plurality of food pieces in the presence of water, removing substantially all of any existing free water present with the cooked food pieces to form voids in the precooked food pieces while leaving the pieces moist, and partially freezing the moist food pieces to rigidity the food pieces and to leave some unfrozen moisture remaining on exterior surfaces of the food pieces, the improvement comprising the steps of:

transferring the partially frozen food pieces into a series of storage containers;

adding a freezing gas into each container to further freeze the food pieces;

adding dry additives to the partially frozen food pieces within each container;

forming a first seal on each container to close the containers around the food pieces and adjuvant; and agitating the containers so that the additives uniformly coat the food pieces by adhering to the said unfrozen moisture.

2. The method of claim 1 wherein the step of transferring the partially frozen food pieces into the storage containers comprises the steps of:

weighing the frozen food pieces to obtain a preselected amount of food pieces to be placed in each container; and placing the weighed food pieces in each container.

3. The method of claim 2 wherein the step of placing the food pieces in each container is accomplished by manually scooping the food pieces into the containers.

4. The method of claim 1 further comprising the step of placing the storage containers containing the completely frozen, coated food pieces into a holding freezer for later use after the agitating step.

5. The method of claim 1 wherein the freezing gas is inert.

6. The method of claim 5 wherein the freezing gas is a gas in solid form that sublimates directly to a gaseous state.

7. The method of claim 6 wherein the freezing gas is carbon dioxide.

8. The method of claim 1 wherein the storage containers are heat-sealable bags having one open end.

9. The method of claim 8 wherein the open end to each storage container includes one or more porous end pieces that allow the freezing gas to escape from the container during the agitation step after the first seal is formed in the one or more porous end pieces.

10. The method of claim 9 wherein the one or more porous end pieces are formed by at least one section of a porous material encircling the open end of the container.

11. The method of claim 9 wherein the container comprises an inner thermoplastic layer, a moisture barrier layer laminated to one side the inner layer, and an outer thermoplastic layer laminated to the barrier layer opposite the inner layer.

12. The method of claim 11 wherein the one or more porous end pieces are formed by shortening the barrier layer so the outer layer is laminated directly to the inner layer at the open end of the bag.

13. The method of claim 9 further comprising the steps of:

forming a second seal on the container below the one or more porous end pieces after the agitation step; and trimming the one or more porous end pieces and first seal from the container.

14. The method of claim 13 wherein the steps of forming the first and second seals comprise passing the container through a heat sealer.

15. A method for preparing a frozen food product comprising the steps of:

cooking a plurality of food pieces in the presence of water, wherein the food product is prepared by removing substantially all of any existing free water present with the cooked food pieces to form voids in the precooked food pieces while leaving the pieces moist, and partially freezing the moist food pieces to rigidify the food pieces and to leave some unfrozen moisture remaining on exterior surfaces of the food pieces;

transferring the partially frozen food pieces into a series of storage containers, each container including one or more gas-permeable sections disposed at one end of the container;

adding a freezing gas into each container to further freeze the food pieces;

adding dry additives to the partially frozen food pieces within each container;

forming a first seal through the one or more said gas-permeable sections on each container to close the containers about the food pieces and adjuvant; and agitating the containers so that the additives uniformly coat the food pieces by adhering to the said unfrozen moisture.

* * * * *